United States Patent [19]

Gellert

[11] Patent Number: 4,820,147
[45] Date of Patent: Apr. 11, 1989

[54] INJECTION MOLDING ELONGATED PROBE HAVING INTEGRAL HEATING ELEMENT AND LOCATING MEANS

[76] Inventor: Jobst U. Gellert, 7A Prince Street, Georgetown, Ontario, Canada, L7G 2X1

[21] Appl. No.: 186,551

[22] Filed: Apr. 27, 1988

[30] Foreign Application Priority Data

Apr. 13, 1988 [CA] Canada .................................. 563,983

[51] Int. Cl.[4] ............................................. B29C 45/20
[52] U.S. Cl. ................................ 425/549; 264/328.15; 425/568; 425/572; 425/588
[58] Field of Search ............... 425/547, 549, 568, 569, 425/570, 571, 572, 564, 588; 264/328.8, 328.9, 328.15

[56] References Cited

U.S. PATENT DOCUMENTS

| 4,376,244 | 3/1983 | Gellert | 219/530 |
| 4,611,394 | 9/1986 | Gellert | 29/611 |
| 4,688,622 | 8/1987 | Gellert | 164/61 |

Primary Examiner—Jay H. Woo
Assistant Examiner—Timothy W. Heitbrink
Attorney, Agent, or Firm—Riches, McKenzie & Herbert

[57] ABSTRACT

This invention relates to a hot tip gated multicavity injection molding system wherein an elongated heated probe extends centrally in a straight portion of the melt passage leading to each gate in a position wherein a tip end of the probe is centrally aligned adjacent the gate. One part of the straight portion of the melt passage is formed by a locating sleeve which is seated in the cavity plate and has spaced pins which extend inwardly to contact the outer surface of the probe to accurately locate the probe with the tip end in central alignment with the gate. Each probe has a central heating element with a double thickness portion extending to provide additional heat where the pins contact the probe. One of the pins is hollow to receive a thermocouple to measure the temperature of the melt flowing past the pins. Another part of the straight portions of the melt passage is formed by a cylindrical spacer collar which extends between the manifold and each locating sleeve to provide an insulating space of a curtain width between the manifold and the cavity plate.

5 Claims, 1 Drawing Sheet

//INJECTION MOLDING ELONGATED PROBE HAVING INTEGRAL HEATING ELEMENT AND LOCATING MEANS

BACKGROUND OF THE INVENTION

This invention relates to a hot tip gated injection molding system having a heated probe which is mounted to extend longitudinally into the melt passage with the tip end adjacent the gate, and more particularly to a locating sleeve seated in the cavity plate to accurately locate the probe with the tip end in alignment with the gate.

Elongated probes having an integral heating element and a tip end extending adjacent the gate are well known. Example are shown in the applicant's prior U.S. Pat. Nos. 4,376,244 which issued Mar. 8, 1983 and 4,611,394 which issued Sept. 16, 1986. Accurate alignment of the tip end with the gate is critical to the successful operation of the system and this has previously been provided using finned locating washers positioned between plates or inserts. It is also known to use a thermocouple to measure temperature adjacent the melt flow. With the trend to probes of smaller dimensions for some applications, it is advantageous to combine the provision of probe locating means with provision for an interchangeable thermocouple to measure temperature at the critical point.

SUMMARY OF THE INVENTION

Accordingly, it is an object of the present invention to at least partially overcome these disadvantages by providing a locating sleeve which is seated in the cavity plate in contact with the outer surface of the probe to accurately located the tip end of the probe in alignment with the gate and provide for an interchangeable thermocouple precisely where the melt temperature needs to be measured.

To the end, in one of its aspects, the invention provides an injection molding system having an elongated heated probe with a generally cylindrical outer surface and a forward tip end and a melt passage which extends to convey pressurized melt from a heated manifold to a gate in a cavity plate leading top a cavity, the heated probe being mounted to extend through the manifold and centrally axially into a straight portion of the melt passage which leads to the gate and is substantially larger in diameter than the heated probe, the heated probe extending to a position wherein the tip end of the heated probe is adjacent the gate and the melt flows around the probe longitudinally to the gate, the improvement wherein, a locating sleeve having a forward and a rear end is seated in the cavity plate in coaxial alignment with the straight portion of the melt passage, the sleeve having a central bore extending axially therethrough which is equal in diameter to and forms part of the straight portion of the melt passage with the heated probe extending centrally therethrough, the locating sleeve having a plurality of spaced locating means extending radially inward into the central bore to contact the outer surface of the probe to accurately locate the probe centrally in the straight portion of the melt passage with the tip end of the probe in central alignment with the gate, at least one of the locating means being partially hollow to receive a thermocouple therein to measure the temperature of the melt flowing past the said one locating means.

Further objects and advantages of the invention will appear from the following description, taken together with the accompanying drawings.

DETAILED DESCRIPTION OF THE DRAWINGS

Figure 1:
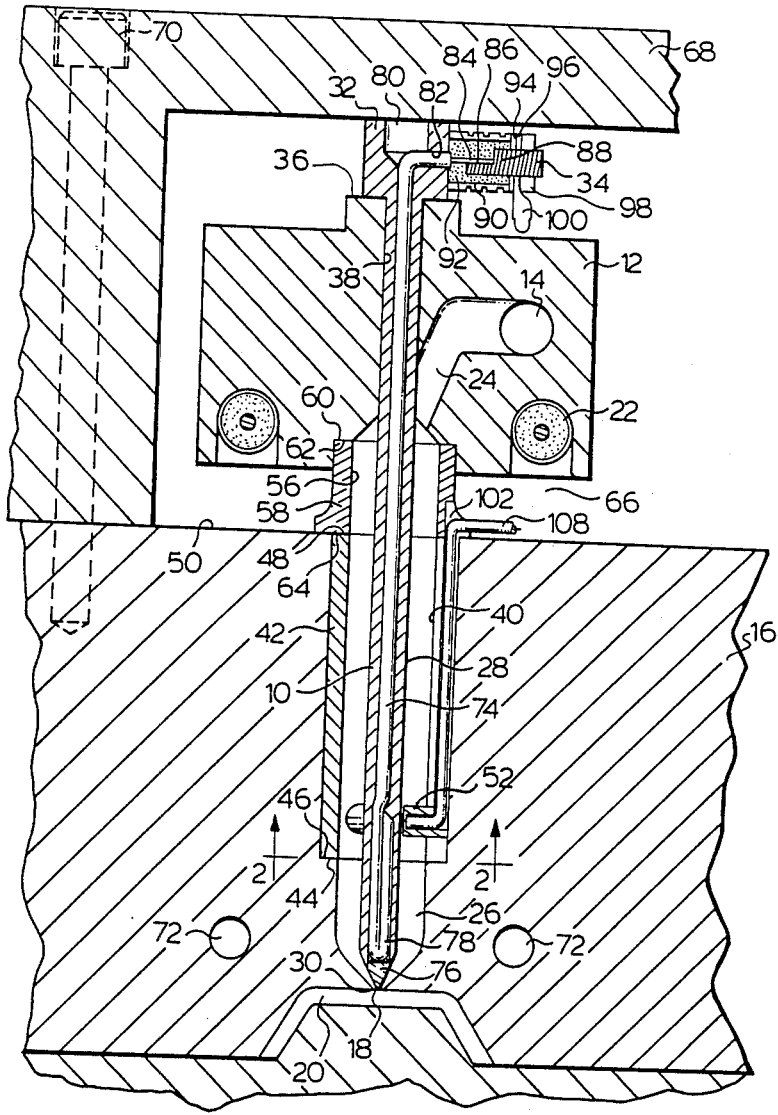
FIG. 1 is a sectional view of a portion of an injection molding system showing a locating sleeve according to a preferred embodiment of the invention.

Reference is first made to FIG. 1 which shows one of the heated probes 10 of a multi-cavity injection molding system. The system has a manifold 12 with a configuration which provides for a melt passage 14 which receives pressurized melt from a molding machine (not shown). The melt passage 15 branches in the manifold 12 and extends into the cavity plate 16 to convey the melt to each gate 18 leading to a cavity 20. The steel manifold 12 is heated by an electric heating element 22 which is cast into it as described in the applicant's U.S. Pat. No. 4,688,622 entitled "Injection Molding Manifold Member and Method of Manufacture" which issued Aug. 25, 1987.

As can be seen, each branch of the melt passage 14 has a diagonal portion 24 which extends through the manifold 12 and connects to a straight portion 26 which extends in the cavity plate 16 and curves smoothly inward to the gate 18. Each heated probe 10 is elongated with a generally cylindrical outer surface 28 with a forward tip end 30 and an enlarged head 32 and a cold terminal 34 at the rear end 36. The probe 10 extends snugly though a bore 38 through the manifold 12 and projects centrally axially into the straight portion 26 of the melt passage 14 to a position wherein the tip end 30 is adjacent to and aligned centrally with the gate 18. The straight portion 26 of the melt passage 14 is considerably larger in diameter than the heated probe 10 whereby the pressurized melt flows along around it to the gate 18. The central location of the tip end 30 at the gate 18 provides a controlled heat distribution in the gate area which is critical to high performance gating during use.

Part of the straight portion 26 of the melt passage 14 is formed by the equal diameter central bore 40 of a locating sleeve 42 which is seated in the cavity plate 16 with a forward end 44 seated against a shoulder 46 and a rear end 48 flush with the face 50 of the cavity plate 16. As more clearly seen in FIG. 2, the locating sleeve 42 has three equally spaced pins 52 which extend radially inward into the central bore 40 adjacent the forward end 44 of the locating collar 42 to contact the outer surface 28 of the heated probe 10. As will be appreciated, this accurately aligns the probe 10 in the straight portion 26 of the melt passage 14 with the tip end 30 of the probe 10 in central alignment with the gate 18. The pins 52 are hollow with closed concave inner blind ends 54 and are brazed in place to be an integral part of the locating sleeve 42.

Another part of the straight portion 26 of the melt passage 14 is formed by the equal diameter central bore 56 of a spacer collar 58 which extends between the rear end 48 of the locating sleeves 42 and the manifold 12. The spacer collar 58 is generally cylindrical and has a rear end 60 which is seated against a shoulder 62 in the manifold 12 and an outwardly flanged forward end 64 which abuts against the face 50 of the cavity plate 16 to provide an air space 66 of a predetermined width between the manifold 12 and the cavity plate 16. The central bore 56 of the spacer collar 58 is equal in diameter to and in alignment with the central bore 40 of the locating sleeve 42 and the rear end 60 of the spacer collar 58 connects with the diagonal portion 24 of the melt passage 14 in the manifold 12. The manifold 12 is held securely against the spacer collars 58 by the back plate 68 being tightened against the head 32 of the probe 10 by bolts 70 which extend into the cavity plate 16. The manifold 12 is also laterally located by a central locating ring (now shown) extending between it and the cavity plate 16. The cavity plate is cooled by cooling water which is pumped through cooling conduits 72. Thus, the heated manifold 12 is separated from the cooled cavity plate 16 by the insulative air space 66 which is bridged by the spacer collar 58.

The heated probe 10 has an electrically insulated heating element 74 which extends from the head 32 at the rear end 36 to a tool steel insert portion 76 which forms the tip end 30. In the low voltage embodiment shown, the heating element 74 has a nickel-chrome resistance wire extending centrally through a refractory powder insulating material such as magnesium oxide in a steel casing. The heating element 74 is doubled back upon itself and swaged in a die to provide a double thickness portion 78 with a circular cross-section which extends from the insert portion 76 past where the pins 52 of the locating sleeve 42 contact the outer surface 28 of the probe 10. The provides additional heat to the probe 10 adjacent the tip end 30 and particularly in the area contacted by the pins 52 to compensate for any heat loss through the pins 52. The enlarged head 32 of the probe 10 has a central opening 80 therein to reduce heat loss to the back plate 68 and the heating element 74 projects laterally out through a slot 82. A projecting portion 84 of the heating element 74 is stripped of its casing and insulation and welded to a flat surface 86 on a larger diameter threaded stud 88. A cylindrical steel sleeve 90 is mounted over the threaded stud 88 and tack welded to hold it in position. The heating element 74, tool steel insert portion 76 and sleeve 90 are integrally brazed in place by heating in a vacuum furnace in a process similar to that described in the applicant's co-pending Canadian patent application Ser. No. 563,981 entitled "Injection Molding Nozzle Having Multiple Thickness Heating Element and Method of Manufacture" filed Apr. 13, 1988. After the furnace is evacuated to a relatively high vacuum to remove substantially all of the oxygen, the vacuum is reduced by partially back filling with an inert gas such as argon or nitrogen. After removal from the vacuum furnace, a liquid ceramic insulating material 92 is poured into the sleeve 90 around the threaded stud 88 similarly to the method described in the applicant's Canadian patent application Ser. No. 549,520 entitled "Method of Manufacture of Injection Molding Nozzle Electrical Terminal" filed Oct. 16, 1987. A ceramic washer 94 and steel washer 96 are then located on the projecting stud 88 which receives a nut 98 to attached an external electrical lead 100 during use.

Figure 2:
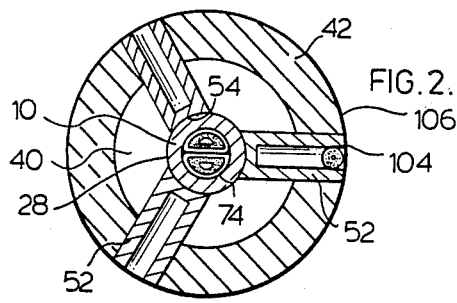
FIG. 2 is a cross-sectional view through the locating sleeve seen in FIG. 1 showing the arrangement of the inwardly extending pins.

The flanged forward end 64 of the spacer collar 58 has a notch 102 in alignment with a groove 104 in the outer surface 106 of the locating sleeve 42. As seen in FIG. 2, the groove 104 extends to one of the inwardly projecting hollow pins 52. Thus, a thermocouple 108 is mounted in the pin 52 to measure the temperature of the melt flowing past the pin adjacent the double thickness portion 78 of the heating element 74 with the thermocouple lead 110 extending out through the groove 104 and notch 102.

In use, after the injection molding system has been assembled as described above with a number of cavities in a desired configuration, electrical power is applied to the heating element 22 in the manifold 12 and the heating element 74 in each probe 10 to heat them to a predetermined operating temperature. Pressurized melt from a molding machine (not shown) is then introduced into the melt passage 14 through an inlet to the manifold 12 according to a predetermined cycle in a conventional manner. The pressurized melt flows from the melt passage 14 through each gate 18 and fills the cavities 20. When the melt is initially introduced into the melt passage 14, some of its solidifies adjacent the cooled cavity plate 16 and the locating sleeves 42 and spacer collars 58 which provides some insulation and helps to prevent leakage. However, the melt which flows along close to the outer surface 28 of each probe 10 is maintained by heat from the probe above its melting temperature until it flows past the tip end 30 into the cavity 20 where it solidifies. After the cavities 20 are filled, injection pressure is held momentarily to pack and then released. After a short cooling period the gate freezes and the mold is opened to eject the molding products. After ejection, the mold is closed and injection pressure is reapplied to refill the cavities. The cycle is repeated continuously with a frequency dependant on the size and shape of the cavities and the type of material being molded. As mentioned above, the combination of accurate location of the tip end 30 of each probe 10 in the respective gate 18 and provision for temperature measurement is critical to the successful continual operation of the system.

While the description of the system has been given with respect to a preferred embodiment, it is not to be construed in a limiting sense. Variations and modifications will occur to those skilled in the art. For instance, the locating sleeve 42 can have inwardly projecting fins rather than pins 52. Reference is made to the appended claims for a definition of the invention.

What I claim is:

1. In an injection molding system having an elongated heated probe and a melt passage which extends to convey pressurized melt from a heated manifold to a gate in a cavity plate leading to a cavity, the heated probe having a generally cylindrical outer surface and a forward tip end, the heated probe being mounted to extend through the manifold and centrally axially into a straight portion of the melt passage which leads to the gate, said melt passage being substantially larger in diameter than the heat probe, the heated probe extending to a position wherein the tip end of the heated probe is adjacent the gate and the melt flows around the probe longitudinally to the gate, the improvement wherein;

a locating sleeve having a forward end and a rear end is seated in the cavity plate in coaxial alignment with the straight portion of the melt passage, the sleeve having a central bore extending axially therethrough which is equal in diameter to and forms part of the straight portion of the melt passage with the heated probe extending centrally therethrough, the locating sleeve having a plurality of spaced locating means extending radially inward into the central bore to contact the outer surface of the probe to accurately locate the probe centrally in the straight portion of the melt passage with the tip end of the probe in central alignment with the gate, at least one of the locating means being partially hollow to receive a thermocouple therein to measure the temperature of the melt flowing past the said one locating means.

2. An injection molding system as claimed in claim 1, wherein the locating means are pins which extend inwardly to locate the probe.

3. An injection molding system as claimed in claim 2, wherein the pins are located adjacent the forward end of the locating sleeve.

4. An injection molding system as claimed in claim 2, having a spacer collar extending axially in alignment with the rear end of the locating sleeve, the spacer collar having a central bore which is equal in diameter to the central bore of the locating sleeve and also forming a part of the straight portion of the melt passage, the spacer collar having a rear end seated in the manifold and a forward flanged end abutting against the cavity plate to provide a space of a predetermined width between the manifold and the cavity plate.

5. An injection molding system as claimed in claim 2, wherein the probe has a central heating element which is bent back upon itself to provide a double thickness portion which extends along at least a portion of the probe where the pins contact the outer surface of the probe.

* * * * *